United States Patent [19]

Nakagawa et al.

[11] Patent Number: 4,752,905
[45] Date of Patent: Jun. 21, 1988

[54] HIGH-SPEED MULTIPLIER HAVING CARRY-SAVE ADDER CIRCUIT

[75] Inventors: Tetsuya Nakagawa, Kokubunji; Kenji Kaneko, Sagamihara; Yoshimune Hagiwara, Hachioji; Hitoshi Matsushima, Tachikawa; Hirotada Ueda, Kokubunji, all of Japan

[73] Assignee: Hitachi, Ltd., Tokyo, Japan

[21] Appl. No.: 795,451

[22] Filed: Nov. 6, 1985

[30] Foreign Application Priority Data

Nov. 9, 1984 [JP] Japan ................. 59-234909

[51] Int. Cl.[4] ............................ G06F 7/52; G05F 7/50
[52] U.S. Cl. ..................................... 364/760; 364/757; 364/784; 364/754
[58] Field of Search ............... 364/754, 757, 760, 784, 364/758, 759, 738

[56] References Cited

U.S. PATENT DOCUMENTS

| | | | |
|---|---|---|---|
| 4,153,938 | 5/1979 | Ghest et al. | 364/760 |
| 4,215,419 | 7/1980 | Majerski | 364/760 |
| 4,293,922 | 10/1981 | Davio et al. | 364/757 |
| 4,523,210 | 6/1985 | Kregness | 364/760 |
| 4,545,028 | 10/1985 | Ware | 364/760 |
| 4,549,280 | 10/1985 | Schomburg | 364/738 |
| 4,571,701 | 2/1986 | LeRouge | 364/757 |
| 4,575,812 | 3/1986 | Kloker et al. | 364/760 |

OTHER PUBLICATIONS

J. Iwamura et al., "A CMOS/SOS Multiplier", IEEE ISSCC Digest of Technical Papers, Feb. 1984, pp. 92-93.
M. Mano, "Computer System Architecture", Prentice-Hall, Inc., 1982, pp. 18-21.
D. Agrawal, "High-Speed Arithmetic Arrays", IEEE Trans. on Computers, vol. C-28, No. 3, Mar. 1979, pp. 215-224.

Primary Examiner—Gary V. Harkcom
Assistant Examiner—Long T. Nguyen
Attorney, Agent, or Firm—Antonelli, Terry & Wands

[57] ABSTRACT

A high-speed multiplier adapted to VLSI with a regularly arranged structure having a reduced number of addition stages. There is provided a carry save adder circuit wherein a time difference is imparted to signals input to full adders, in order to eliminate extra wait time in the signal propagation. That is, a carry signal of a full adder of two stages over is input with a speed increase of $\frac{1}{2}T_{FA}$.

3 Claims, 15 Drawing Sheets

HIGH-SPEED MULTIPLIER HAVING CARRY-SAVE ADDER CIRCUIT

BACKGROUND OF THE INVENTION

The present invention relates to a high-speed multiplier which can be easily constituted in the form of an integrated circuit.

A single-chip digital signal processor has a high-speed parallel multiplier, and performs multiply and accumulate operations at high speeds, and further performs real-time processing in the field of speech signal processing.

In the field of image processing where the amount of data is considerably greater than that in the field of speech signal processing, it is necessary to perform the multiply and accumulate operations at higher speeds so that the processing is carried out in real time. Therefore, it has been desired to develop a high-speed multiplier which can be used for such applications.

In the parallel multiplier which can perform arithmetic operation at high speeds, the full adders are arranged in an array structure to add the partial products in parallel.

The algorithm of parallel multiplication can be divided into the following two steps:

(1) The partial products are formed simultaneously by ANDing a multiplicand bit with a mulplier bit.

(2) The partial products are added concurrently to find a product.

There has been known a modified Booth algorithm to carry out the above method (1) at high speeds.

This method makes it possible to halve the number of partial products within a short period of time.

Therefore, the operation speed can be doubled in the above method (2).

In order to carry out the above method (2) at high speeds, we have hitherto frequently employed carry save addition.

FIG. 1 shows a system for carry save addition (S. Waser, "High Speed Monolithic Multipliers for Real-Time Digital Signal Processing", Computer, pp. 19–28, Oct., 1978). This system is based on a principle that when the sum of three or more partial products (Q1, Q4, Q7), (Q2, Q5, Q8), (Q3, Q6, Q9), (Q10, Q11, Q12), ------, each consisting of three bits, is to be found, the carry propagation is postponed until the last time.

That is, in FIG. 1, a carry Co obtained by adding three bits Q7, Q8, Q9 through a full adder 102 is not input to a full adder 101 of upper bit 1 on the same stage, but is added to a fourth bit Q11 of a full adder 104 of one stage under together with a sum So of the full adder 101. In FIG. 1, black circles represent bits of partial products. The above-mentioned procedure is repeated until there is no bit to add. There will finally be obtained two bits.

One of these bits consists of a sum of the last stage, and another bit consists of a carry of the last stage. If these two bits are added together without carry propagation by using a carry-look ahead adder, the carry propagation in the horizontal direction can be avoided, and the operation speed can be increased correspondingly.

In regard to the above-mentioned method (2), a Wallace tree has been known to maximize the operation speed by minimizing the number of stages of full adders through which the signals pass.

The principle of this method consists of adding the partial products in parallel. This method will be described below in conjunction with FIG. 2 wherein black circles represent bits of partial products like those of FIG. 1. FIG. 2 shows the case where eight partial products, each consisting of three bits, are added together, i.e., (Q22, Q25, Q28), (Q23, Q26, Q29). (Q24, Q27, Q30), (Q31, Q34, Q37), (Q32, Q35, Q38), (Q33, Q36, Q39), (Q40, Q42, Q44), (Q41, Q43, Q45) are added together. One full adder can add three bits at one time. Therefore, three partial products Q22 to Q30 are added by full adders 200 to 202 of the first stage of FIG. 2, and another three partial products Q31 to Q39 are added by full adders 203 to 205 of the second stage, so that six partial products can be added in parallel.

Then, a bit consisting of the sum S of full adders 200 to 202 of the first stage, and the remaining two partial products, are added through full adders 206 to 208 of the third stage. At the same time, a total of three bits, i.e., a bit consisting of the carry Co of full adders 200 to 202 of the first stage, and two bits consisting of a carry Co and a sum So of full adders 203 to 205 of the second stage, are added through full adders of the fourth stage.

According to the Wallace tree as mentioned above, n partial products are divided into n/3 groups each consisting of three partial products. These groups are then added in parallel thereby to simultaneously obtain a total of 2n/3 bits, i.e., to obtain n/3 bits consisting of carries and n/3 bits consisting of sums. That is, n partial products are reduced to 2n/3 with the delay of full adders of one stage.

The thus obtained 2n/3 bits and the remaining partial products if any are divided again into groups each consisting of three bits, and the above-mentioned operation is repeated to reduce the partial products into ⅔ each with the delay of full adders of one stage.

According to the above-mentioned system, therefore, the number of stages of full adders through which n partial products pass before they are reduced to two, is proportional to log n.

In the carry save addition of FIG. 1, there are n−2 stages of full adders through which n partial products must be passed before they are reduced to two products. It can therefore be recognized that the Wallace tree performs the addition at a very high speed compared with the above method. Namely, at present, the multiplication system which can minimize the number of addition stages is obtained by combining the modified Booth algorithm with the Wallace tree.

When the multiplier is to be constituted on an LSI, however, the Wallace tree results in an increase in the number of interconnections and in the length of interconnections, causing the interconnections to become very complex. Therefore, there develops an additional time delay due to parasitic capacitance of interconnections, making it no more reasonable to evaluate the operation speed relying simply upon the number of addition stages. Because of the above-mentioned reasons, therefore, the circuit area increases and the man-hours also increase for logic design and layout design.

Therefore, attempts have been made to improve the carry save addition as shown in FIG. 3 by connecting full adders in the stages of even numbers separately from full adders in the stages of odd numbers (Digest of Tech. Papers 1984, IEEE ISSCC "A CMOS/SOS Multiplier" pp. 92–93). According to this system, n partial products are divided into two groups of a row of an even number and of a row of an odd number, and are subjected to the carry save addition each in a number of n/2 in parallel, enabling the number of addition stages to be halved compared with the conventional number of addition stages. In FIG. 3, full adders 300, 301, 302, 306, 307, 308, 312, 313, 314 constitute carry save adder circuits of rows of odd numbers, and full adders 303, 304, 305, 309, 310, 311 constitute carry save adder circuits of rows of even numbers.

Black circles represent bits of partial products like in the aforementioned cases.

This system does not impair regularity in the conventional carry save adder circuits, and presents the advantage that the amount of interconnections does not increase or the interconnections do not become complex. With regard to the number of addition stages, however, the number is n/2 with this system in comparison with log n of the Wallace tree. Therefore, this system is slightly inferior to the Wallace tree in regard to the operation speed.

SUMMARY OF THE INVENTION

Under the above-mentioned circumstances, the object of the present invention is to provide a high-speed multiplier adapted to a VLSI, which can be constituted in a regularly arranged structure having a number of addition stages that is nearly the same as that of the conventional highest-speed system.

According to the present invention, the feature resides in a carry save adder circuit wherein a time difference is imparted to signals input to a unit adder, in order to eliminate extra wait time in the signal propagation.

100 to 114, 200 to 214, 300 to 314, 400 to 414, 500 to 502, 800 to 814, 900 to 914, 1000 to 1001, 1100 to 1111, 1300 to 1311, 1400 to 1401, 1500 to 1501, FA1 to FAm—full adders Q1 to Q193—partial products A, B, C—input signals to full adders D—intermediate signal of a full adder Co—carry output signal of a full adder So—sum output signal of a full adder U0 - U14—unit circuits consisting of two full adders G to K—input signals to a unit circuit consisting of two full adders L to N—intermediate signals of a unit circuit consisting of two full adders C1—carry signal produced early by a unit circuit consisting of two full adders C2—carry signal produced lately by a unit circuit consisting of two full adders S—sum output signal produced by a unit circuit consisting of two full adders 1200—unit circuit consisting of m full adders $I_1$ to $I_{2m+1}$—input signals to a unit circuit consisting of m full adders $\overline{O}_1$ to $\overline{O}_{m+1}$—output signals produced by a unit circuit consisting of m full adders

DETAILED DESCRIPTION OF THE INVENTION

Prior to describing the embodiments of the invention, flow of signals in the carry save adder circuit will be mentioned to clarify the existing problems.

Figure 1:
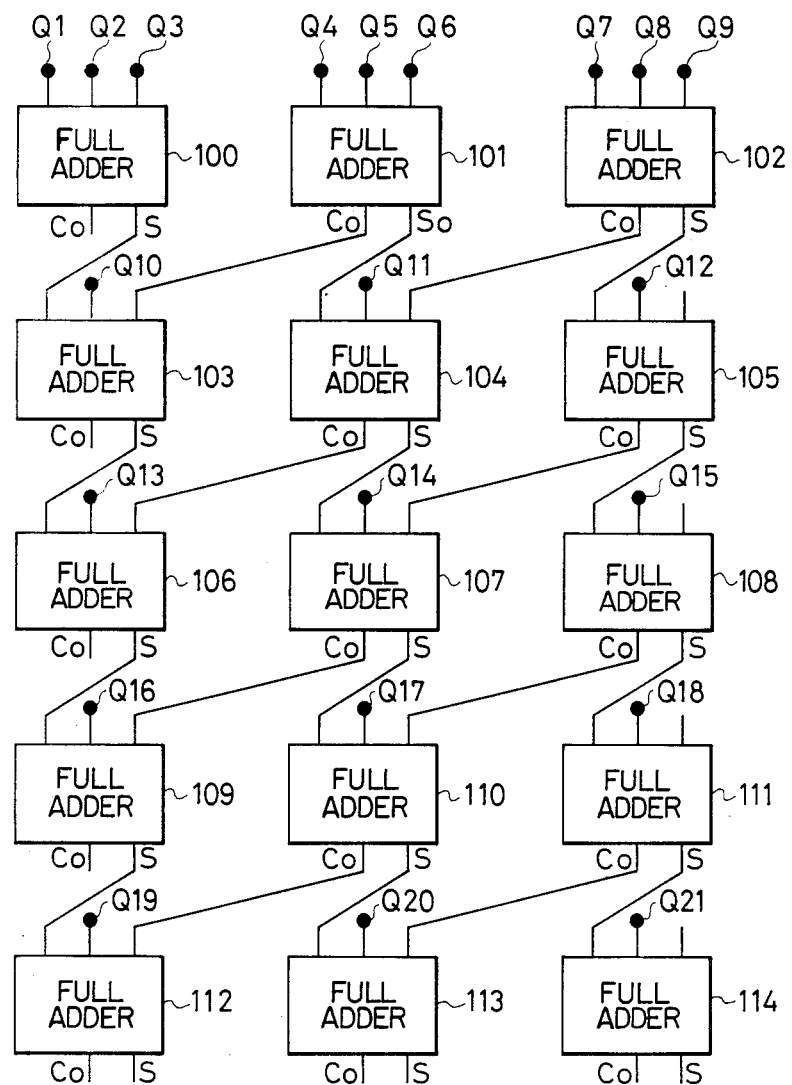
FIG. 1 is a diagram showing the structure of a carry save adder circuit.
Figure 4:
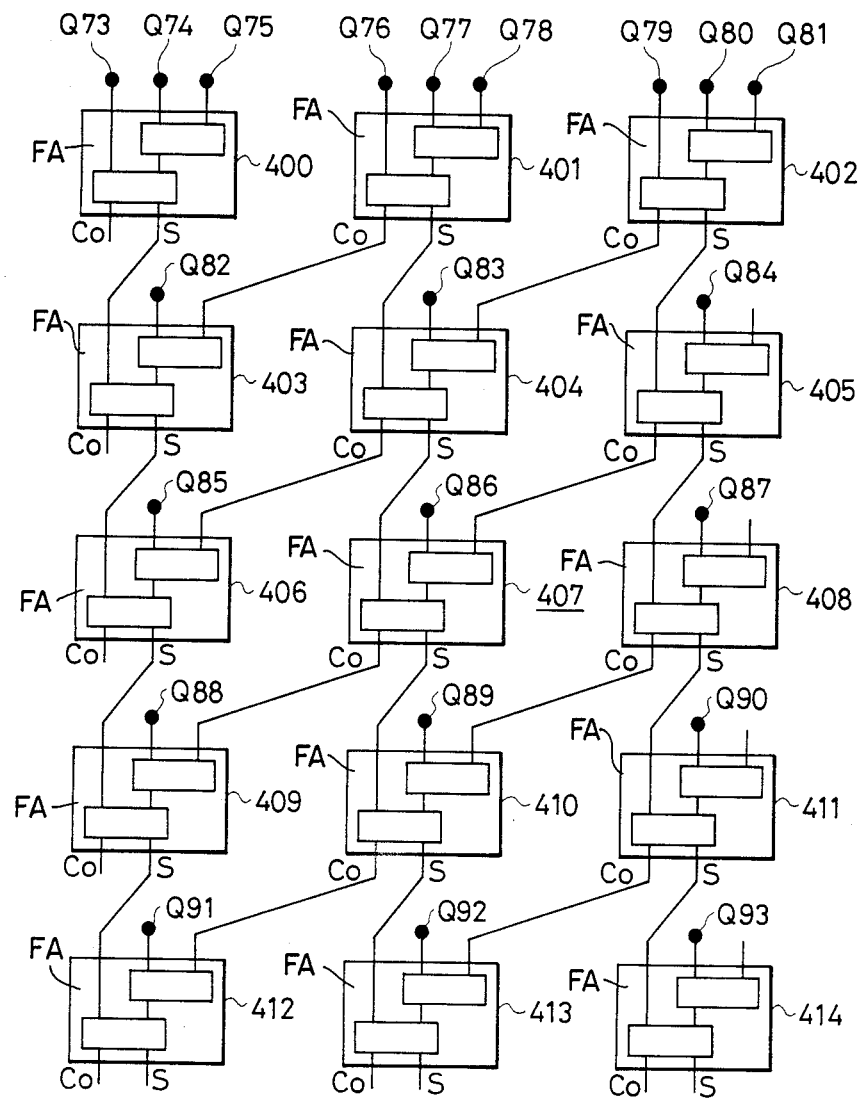
FIG. 4 is a diagram showing the structure of a conventional carry save adder circuit employing full adders that are constituted in two stages.

FIG. 4 shows a carry save adder circuit of FIG. 1.

Figure 5A:
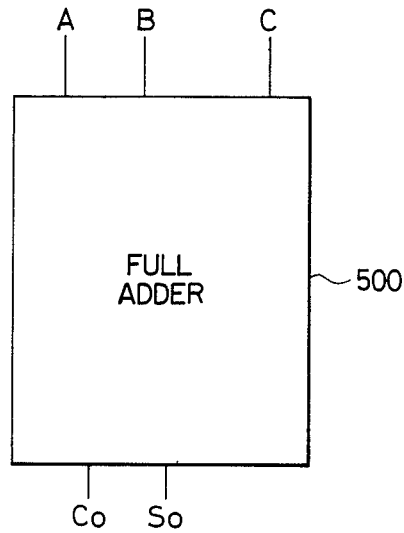
FIGS. 5(a) to 5(c) are diagrams of full adders constituted in two stages.
Figure 5B:
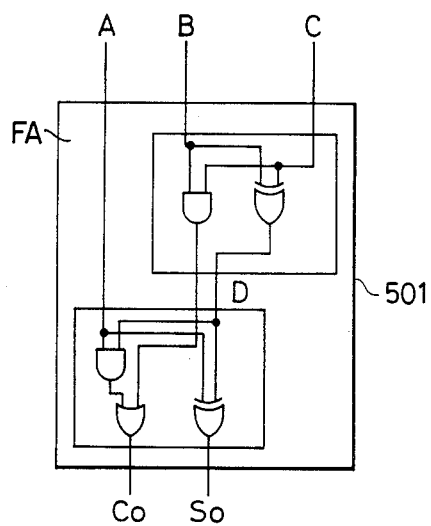
Figure 5C:
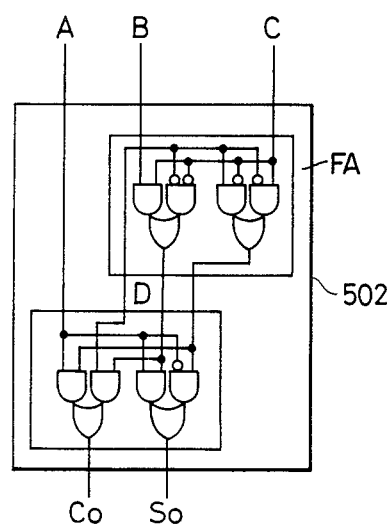

Full adders which are constituent elements of the circuit are usually arranged in two stages, i.e., front stage and rear stage as shown in the diagrams (b) and (c) in FIG. 5.

For easy comprehension of the invention, it is now presumed that the circuit of the front stage and the circuit of the rear stage have the same delay. This, however, need not necessarily be so. However, an optimum condition is established when the front stage and the rear stage have the same amount of delay.

Input/output timings will now be considered below by giving attention to a full adder 407 in the circuit of FIG. 4.

Among the three input signals to the full adder, one is a partial product Q86 that is to be added and that is arriving earliest in time.

This input signal is input to the full adder of the front stage and is denoted by a black circle.

Other two input signals are produced from full adders of one stage over, and arrive nearly simultaneously in this structure.

Figure 6A:
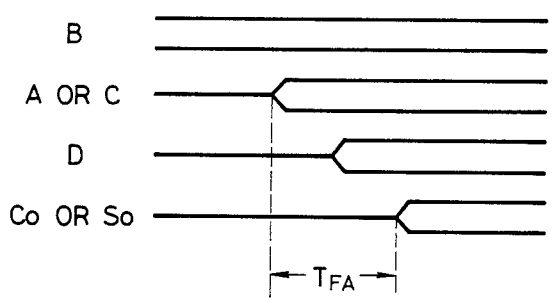
FIG. 6 (a) is a diagram of input/output timings and FIG. 6(b) is a diagram of full adders in the conventional carry save adder circuit.
Figure 6B:
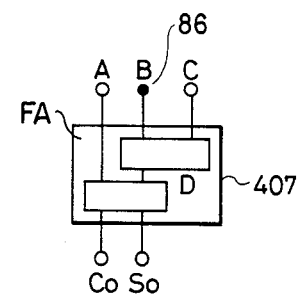

FIG. 6 shows input/output timings of this case in detail.

In FIG. 6, the signals A and C are a sum So and a carry Co of full adders of one stage above, and hence arrive simultaneously. The signal A is input to the rear stage as it arrives, and the signal C is input to the front stage as it arrives.

Therefore, if the delay of full adder of one stage is denoted by $T_{FA}$, a time $\frac{1}{2}T_{FA}$ lapses from when the signal c is input until an intermediate signal D is determined, and another time $\frac{1}{2}T_{FA}$ lapses from when the signal D is determined until output signals E, F are determined.

That is, since the signal A arrives at the rear stage of the full adder, the time $\frac{1}{2}T_{FA}$ must be waited for until the signal D is determined.

In the circuit of FIG. 4, this wait time produces a delay $T_{FA}$ per one stage of full adder.

The present invention provides a multiplier system which operates at high speeds by eliminating such a wasteful wait time.

Figure 7:
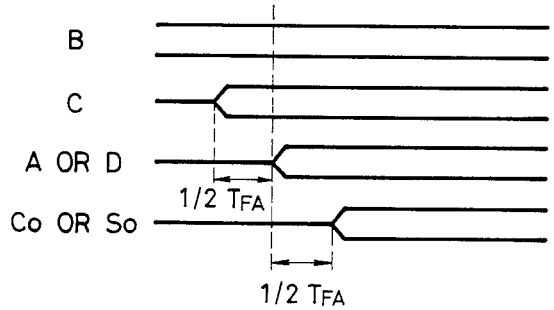
FIG. 7 is a diagram of input/output timings of full adders according to a first embodiment of the present invention.

That is, if the signal C is permitted to arrive earlier than the signal A by $\frac{1}{2}T_{FA}$, the time at which the signal D is determined becomes the same as the time at which the signal A arrives. Therefore, output signals Co, So are determined after the time $\frac{1}{2}T_{FA}$ has passed from the arrival of signal A. FIG. 7 shows relations of signals of this case. Namely, Fig. 7 shows timings of output signals Co, So of when the signal C is permitted to arrive earlier than the signal A by $\frac{1}{2}T_{FA}$, from which it will be understood that the output signals Co, So are obtained after the time $\frac{1}{2}T_{FA}$ has passed from the arrival of signal A. A multiplier of the present invention which can increase the speed of the signal C by $\frac{1}{2}T_{FA}$ will be described below by way of embodiments.

Figure 8:
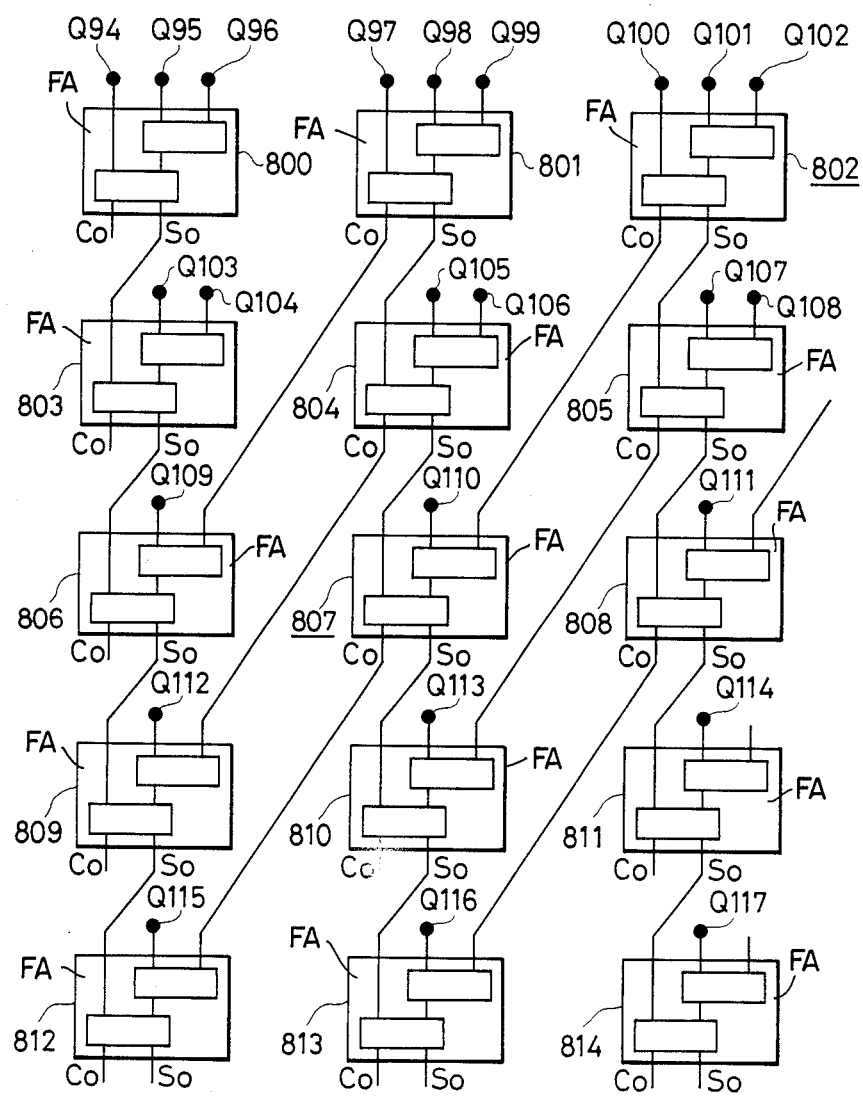
FIG. 8 is a diagram showing the structure according to the first embodiment of the present invention.

FIG. 8 illustrates a first embodiment of the present invention, wherein black circles represent bits of partial products. In the first embodiment of the present invention, each full adder uses a carry signal of two stages over as a signal that corresponds to the above-mentioned signal C. For example, a full adder 807 uses a carry signal of a full adder 802 as a signal that corresponds to the signal C. In the circuit of FIG. 4, a carry signal of a full adder of one stage over is used as a signal that corresponds to the signal C. In the embodiment of FIG. 8, on the other hand, each full adder is allowed to receive a signal that corresponds to the signal earlier by $\frac{1}{2}T_{FA}$ than the signal that corresponds to the signal A. In the embodiment of FIG. 8, full adders 803, 804, 805 in the second stage are not allowed to be served with carry signals from the adders of two stages over. Instead, therefore, they are served with partial products Q104, Q106, Q108.

In this case, a signal corresponding to the signal C is input earlier than a signal corresponding to the signal A by $T_{FA}$, and there is no extra wait time for the signal. Here, however, three partial products are input simultaneously to each of the full adders 800, 801, 802 of the uppermost stage, and the wait time of signal corresponding to the signal A cannot be removed from these full adders.

According to the first embodiment of FIG. 8 as described above, the full adders of the uppermost stage have the delay $T_{FA}$, but the full adders of the second and subsequent stages can transmit signals with the delay $\frac{1}{2}T_{FA}$, so that the number of addition stages becomes n/2.

That is, the first embodiment of the present invention can reduce the number of addition stages to one-half without almost changing the regularity or the wiring complexity compared with the circuit of FIG. 4.

Figure 9:
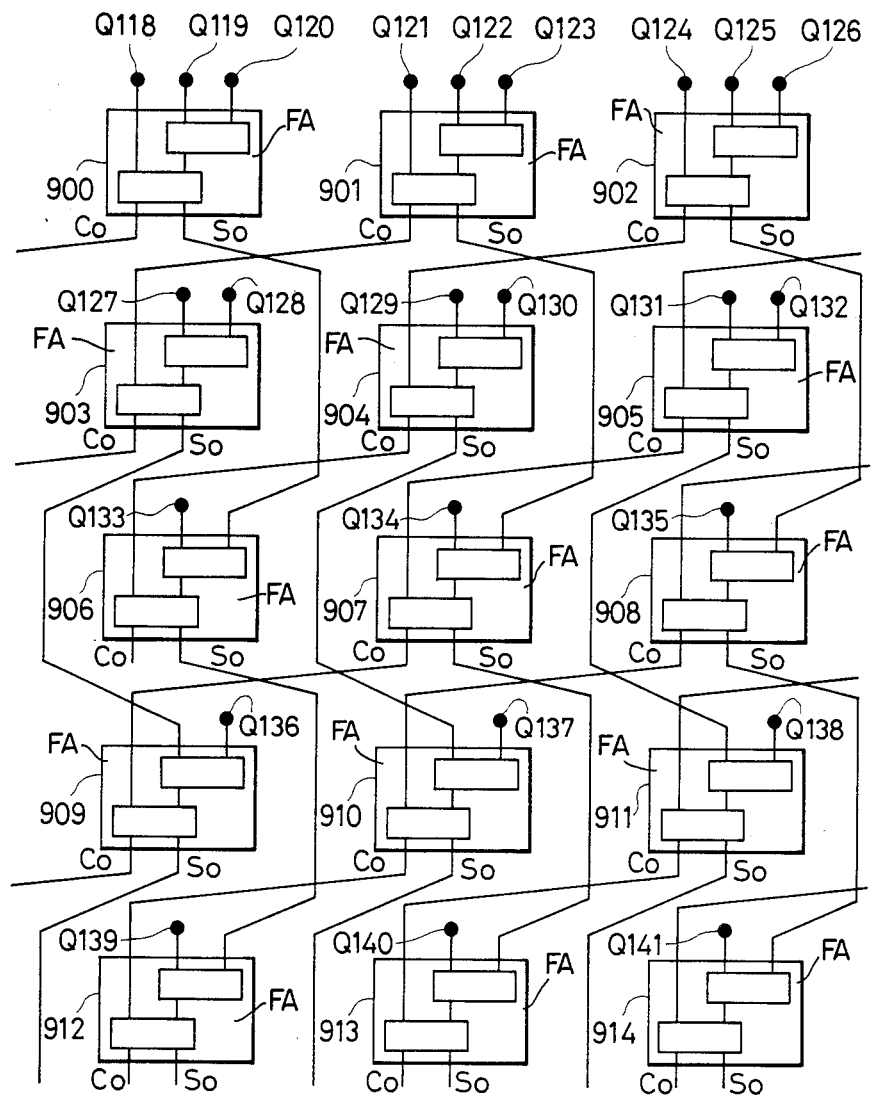
FIG. 9 is a diagram showing the structure according to a second embodiment of the present invention.

FIG. 9 illustrates a second embodiment of the present invention.

This embodiment uses a sum signal of two stages over as a signal that corresponds to the signal C instead of a carry signal of two stages over, to obtain the same effects as those of the first embodiment of FIG. 8.

In the above embodiments, the full adders were divided into those of the front stage and those of the rear stage, in order to remove extra wait time of signal in the full adders.

However, the invention can also be adapted even when the full adder is considered to be a black box.

Described below is an embodiment for this case.

Figure 10A:
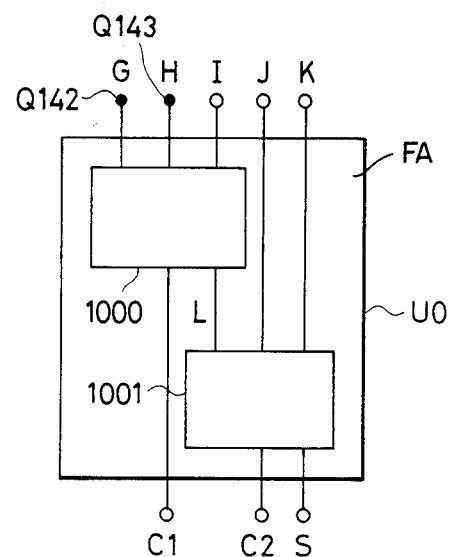
FIG. 10(a) is a diagram showing a unit circuit and FIG. 10(b) is a diagram of input/output timimgs according to a third embodiment of the present invention.
Figure 10B:
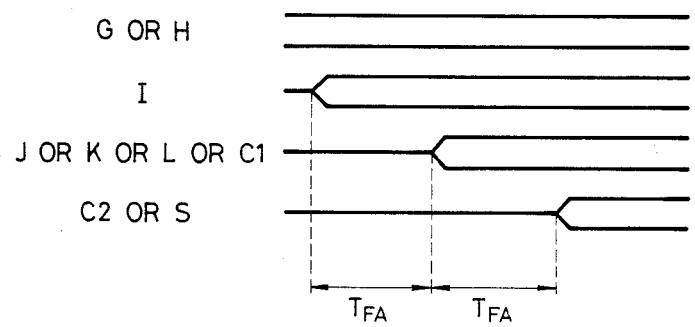

FIG. 10(a) shows a unit UO to constitute a multiplier using an adder circuit of five inputs and three outputs, which consist of two full adders, and Fig. 10(b) shows timings of signals.

In FIG. 10(a), black circles of signals G, H represent partial products that are to be added.

Now, the signals I, J, K are input simultaneously; i.e., the signal I is input to the full adder of the front stage, and the signals J, K are input to the full adder of the rear stage.

Therefore, the signals J, K have to wait for $T_{FA}$ until an intermediate signal L is determined after the signal I has been input.

Accordingly, if the signal I is input earlier than the signals J, K by $T_{FA}$, the wait time for the signals J, K can be removed, and the delay of the unit circuit consisting of full adders of two stages can be reduced to $T_{FA}$ which is equal to the delay of one stage of full adder.

Figure 11:
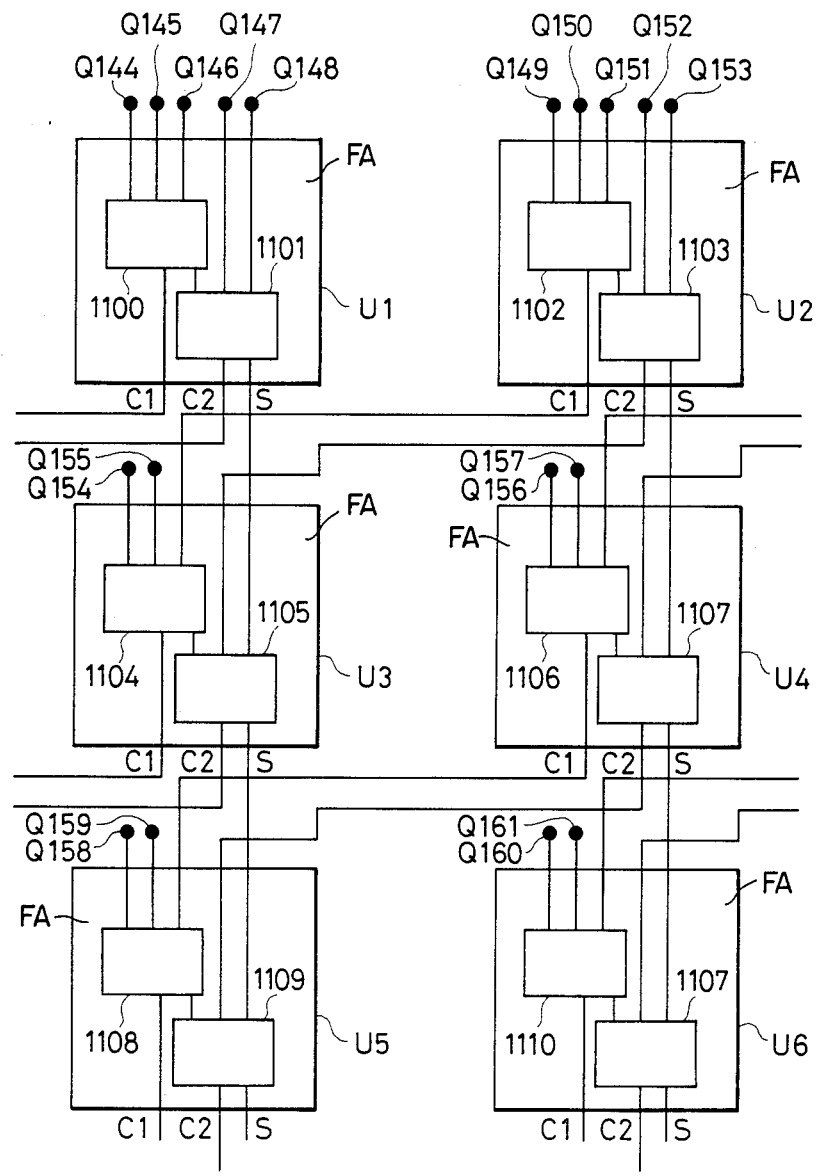
FIG. 11 is a diagram showing the structure of the third embodiment of the present invention.

FIG. 11 shows a third embodiment of the present invention of when the multiplier is constituted using the unit of FIG. 10. The above unit circuit produces three output signals consisting of one sum signal S and two carry signals C1, C2. Among them, one carry signal C1 is produced earlier than the other two signals by $T_{FA}$.

In the embodiment of FIG. 11, each unit circuit uses, as the signal that corresponds to the signal I, a carry signal C1 which is produced early among the output signals produced by the unit circuit of one stage over.

Each unit circuit uses, as the signals corresponding to the signals J, K, a carry signal C2 and a sum signal S that are produced lately by the unit circuit of one stage over.

According to the embodiment of FIG. 11, therefore, each unit circuit enables the signal that corresponds to the signal I to be input earlier by $T_{FA}$ than the signals corresponding to the signals J, K. To the unit circuits U1, U2 of the uppermost stage, however, the five partial products are input simultaneously, and it is not possible to remove wait time for the signals that correspond to the signals J, K.

In the third embodiment of FIG. 11, therefore, the unit circuits U1, U2 of the uppermost stage have delay $2T_{FA}$ which is equal to the delay of two stages of full adders, but the unit circuits U3 to U6 of the second and subsequent stages can transmit the signals with the delay $T_{FA}$ which is equal to the delay of one stage of full adder.

When n bits are to be added, therefore, the embodiment of FIG. 11 makes it possible to reduce the number of addition stages to $\frac{1}{2}(n+1)$ stages.

The number of addition stages is $n-2$ when n bits are to be added by the carry save adder circuit. It will therefore be understood that the third embodiment of FIG. 11 makes it possible to reduce the number of addition stages into about one-half while maintaining regular structure.

In the foregoing was mentioned the case where the unit circuit was constituted by two full adders. However, the invention can further be adapted to more general cases.

Figure 12:
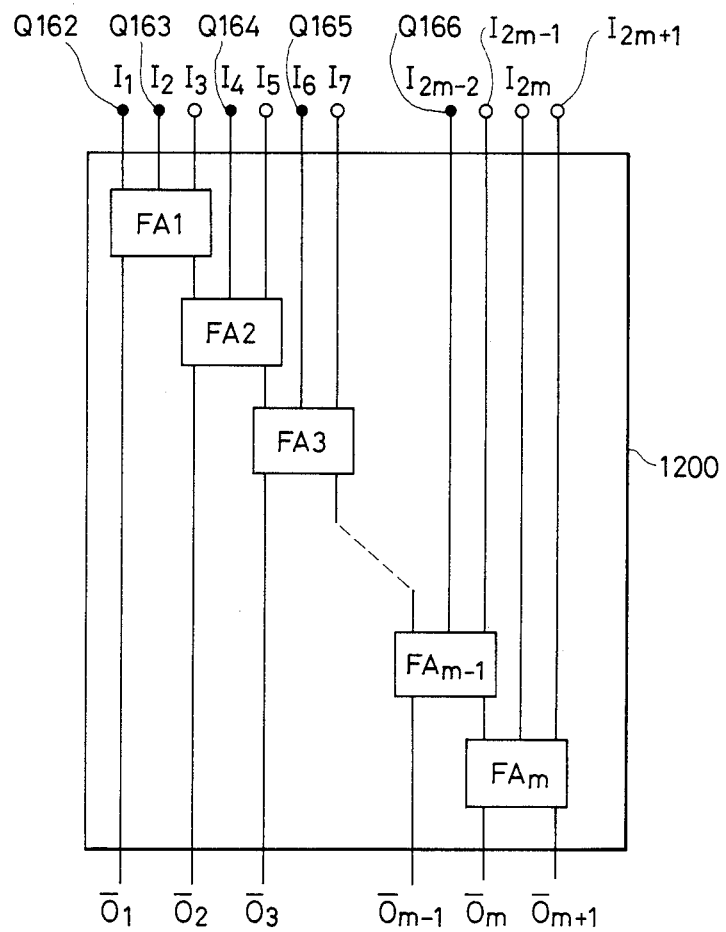
FIG. 12 is a diagram showing the structure of a unit circuit that is used when the third embodiment of the present invention is to be expanded.

FIG. 12 shows an embodiment when a more general multiplier is to be constituted according to the present invention.

By constituting a unit circuit of multiplier of 2m+1 inputs and m+1 outputs using m full adders as shown in FIG. 12, the number of addition stages of the adder circuit can be reduced to 1/m compared with the convention carry save adder circuit.

In this case, also, the time deviation of $T_{FA}$ must be imparted to the arrival time of signals input to the unit circuit in order to remove extra wait time during the propagation, like in the third embodiment.

The time deviation in input signals can be produced quite in the same manner as in the third embodiment by utilizing the fact that the output signals of the unit circuit are deviated in time by $T_{FA}$ and that the partial products are determined earliest in time.

Figure 13:
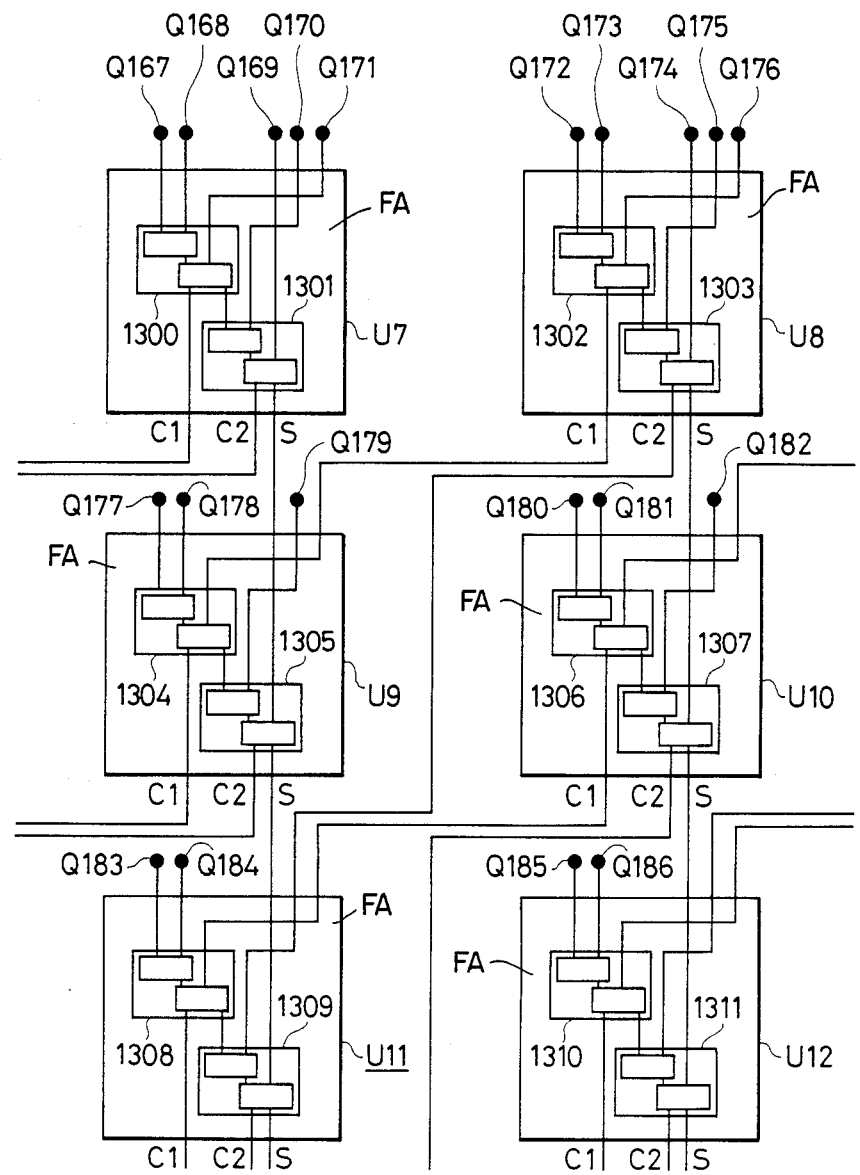
FIG. 13 is a diagram showing the structure according to a fourth embodiment of the present invention.

FIG. 13 illustrates a fourth embodiment of the present invention which consists of a combination of the first embodiment and the third embodiment.

That is, use is made of a unit circuit of Fig. 10 employing two full adders of the two-stage construction in which the full adders are divided into one of the front stage and one of the rear stage as done in the first embodiment.

Figure 14A:
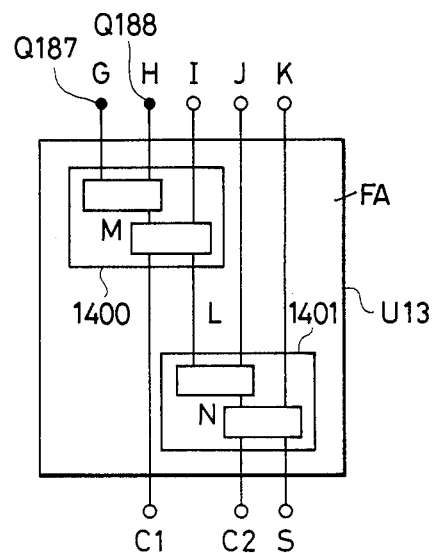
FIG. 14(a) is a diagram showing a unit circuit and FIG. 14(b) is a diagram of input/output timings thereof according to the fourth embodiment of the present invention.
Figure 14B:
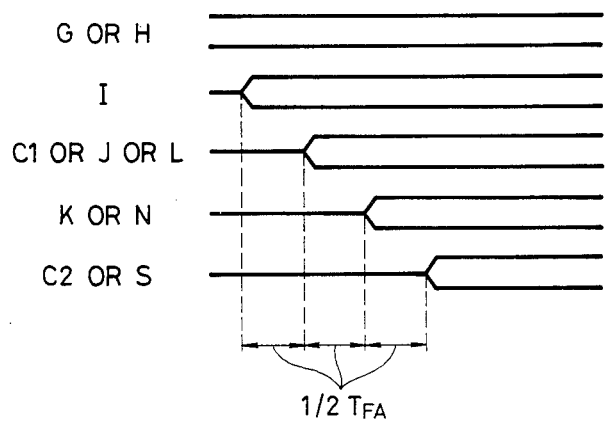

The unit circuit in this case is denoted by U13 in FIG. 14(a), and a time chart thereof is shown in FIG. 14(b).

Extra wait time of signals in and out of the full adders can be removed if a time difference $\frac{1}{2}T_{FA}$ is is given to the input signals as shown in the time chart of FIG. 14. Namely, owing to the same effects as that of the first embodiment, extra wait time in the full adder is first removed, making it possible to halve the number of addition stages.

Moreover, owing to the same efects as those of the third embodiment, extra wait time in the unit circuit is removed to further halve the number of addition stages, and whereby the delay is reduced to a total of $\frac{1}{4}$.

Described below is a time difference developing in the input signals in the fourth embodiment of Fig. 13.

Input/output timings will now be considered below by giving attention to a unit circuit U11 in the fourth embodiment of FIG. 13. The unit circuit U11 receives partial products Q183, Q184 as signals that correspond to the signals G, H of FIG. 14, receives a carry signal C1 produced early by a unit circuit U10 of one stage as the signal that corresponds to the signal I, receives a carry signal C2 produced lately by a unit circuit U8 of two stages over as the signal that corresponds to the signal J, and receives a sum signal S of a unit circuit U9 of one stage over as the signal that corresponds to the signal K.

Here, if attention is paid to the fact that the carry signal C1 produced early by the unit circuit U10 of one stage over is deviated in time by $T_{FA}$ from the sum signal S of U9, to the fact that the sum signal S of the unit circuit U9 of one stage over is produced being delayed by $\frac{1}{2}T_{FA}$ behind the sum signal S of the unit circuit U8 of two stages over, and to the fact that the carry signal C2 produced lately by the unit circuit U8 of two stages over happens to be the same in time as the sum signal S, it will be recognized that the signals corresponding to the signals I. J, K are deviated in time by $\frac{1}{2}T_{FA}$, respectively.

With regard to the unit circuits U9, U10 of the second stage in the fourth embodiment of FIG. 13, there exists no unit circuit of two stages over. Therefore, partial products Q179, Q182 are used instead of carry signals produced lately by the unit circuits of two stages over that are used for the unit circuits of the third and subsequent stages.

In this case, all signals have already been determined earlier by $T_{FA}$ than a moment at which the signal corresponding to the signal K is input. Therefore, output signals of the unit circuits U9, U10 are determined after the period $\frac{1}{2}T_{FA}$ has passed from a moment at which the sum S of U7 and U8 corresponding to the signal K had been input.

Five partial products are simultaneously input to each of the unit circuits U7, U8 of the uppermost stages of the embodiment of FIG. 13. Therefore, it is not possible to remove wait time on input signals to these unit circuits.

Figure 15:
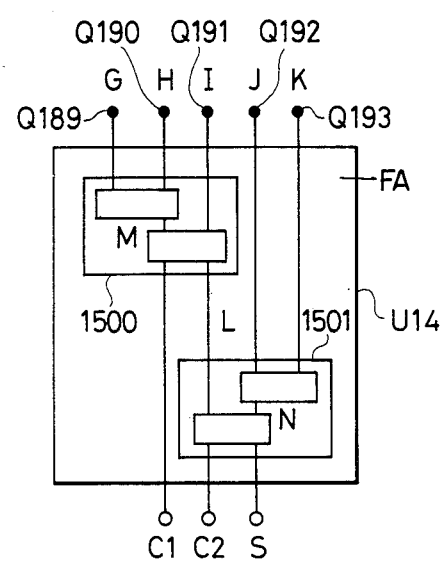
FIG. 15 is a diagram showing the structure of a unit circuit which is used for improving the fourth embodiment of the present invention.

However, if use is made of the circuit of Fig. 15 as a unit circuit of the uppermost stage, wasteful wait time $\frac{1}{2}T_{FA}$ can be removed, and the delay can be reduced to $3/2T_{FA}$.

According to the fourth embodiment of FIG. 13 as described above, the unit circuits of the uppermost stage have a delay of $2T_{FA}$ or $3/2T_{FA}$. However, the unit circuits of the second and subsequent stages can transmit signals with a delay $\frac{1}{2}T_{FA}$, and the number of addition stages can be reduced to (N/4+5/2) or (N/2+2) in the circuit as a whole. Namely, in the fourth embodiment of FIG. 13, the number of addition stages can be reduced to about 174 compared with the case of FIG. 4, without almost changing the regularity or the wiring complexity.

It is possible to further reduce the number of addition stages by combining the embodiments of the present invention in a variety of ways without departing from the scope of the invention.

Figure 16:
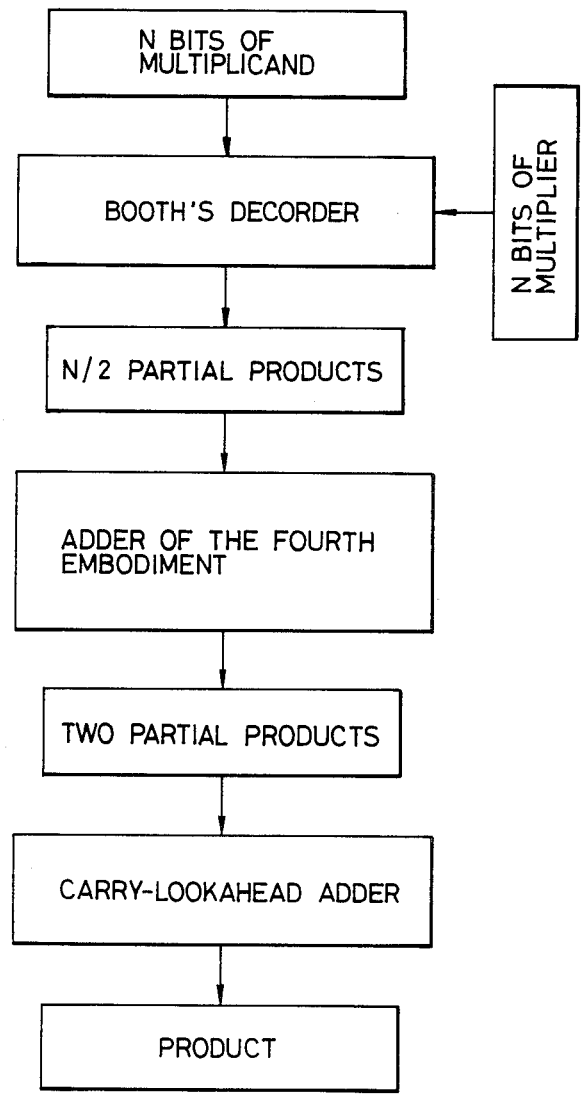
FIG. 16 is a diagram showing the structure according to a fifth embodiment of the present invention.

FIG. 16 shows a fifth embodiment of the present invention, which is a multiplier based upon the combination of the fourth embodiment of the invention and a modified Booth algorithm. According to the modified Booth algorithm, N/2 partial products are formed from N bits of multiplicand and N bits of multiplier. In FIG. 16, this portion is referred to as Booth's decoder. The thus obtained N/2 partial products are reduced to two in accordance with the fourth embodiment. Finally, the two bits are added at a high speed through the carry-look ahead adder to obtain a product, without effecting carry or propagation.

According to the fifth embodiment, the number of addition stages is N/8+4 from a place where the partial products are formed to a place where they are reduced to two, which is about one-eighth the number of addition stages of the multiplier system that employs the carry sane adder circuit only.

Figure 17:
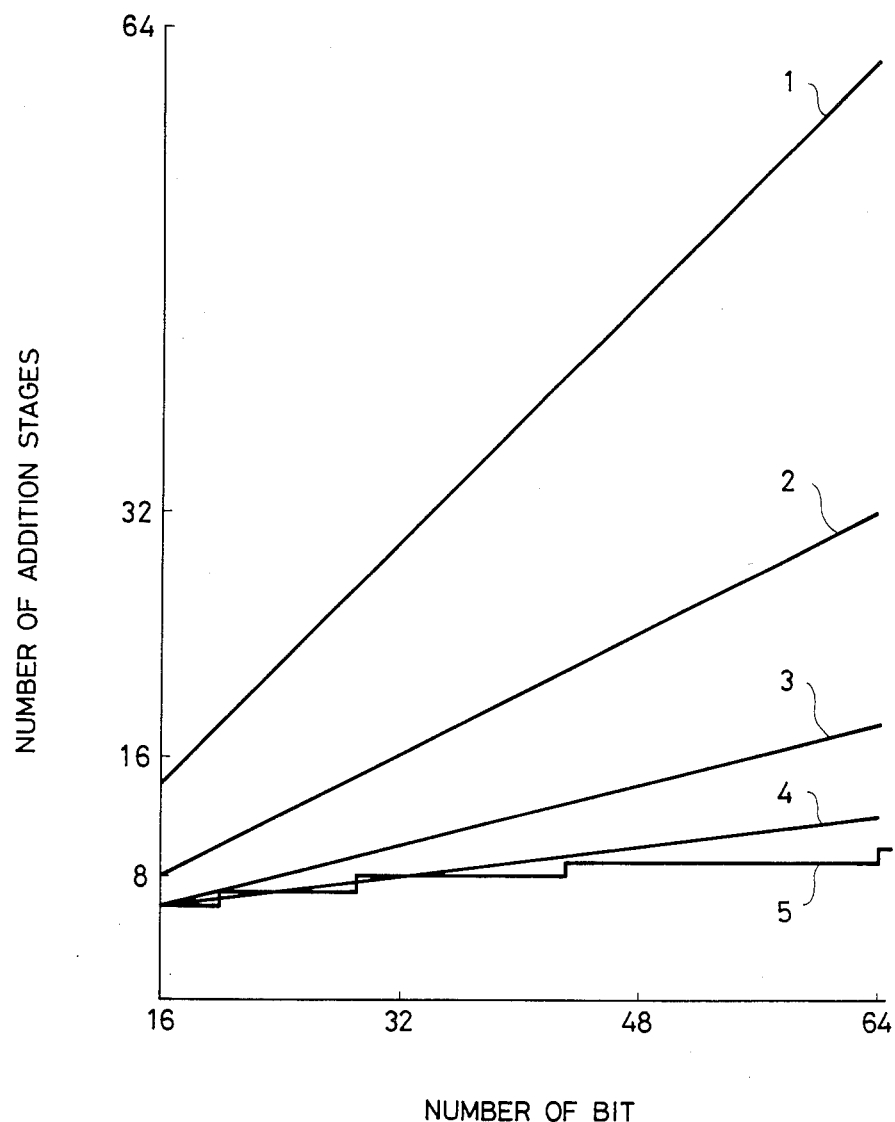
FIG. 17 is a diagram showing relations between the number of addition stages and the bit length in five different multiplication systems.

FIG. 17 is a diagram comparing the number of addition stages of the mulitpliers constructed according to the present invention with that of the conventional multipliers, wherein the abscissa represents the number of bits of data, and the ordinate represents the number of addition stages.

Figure 2:
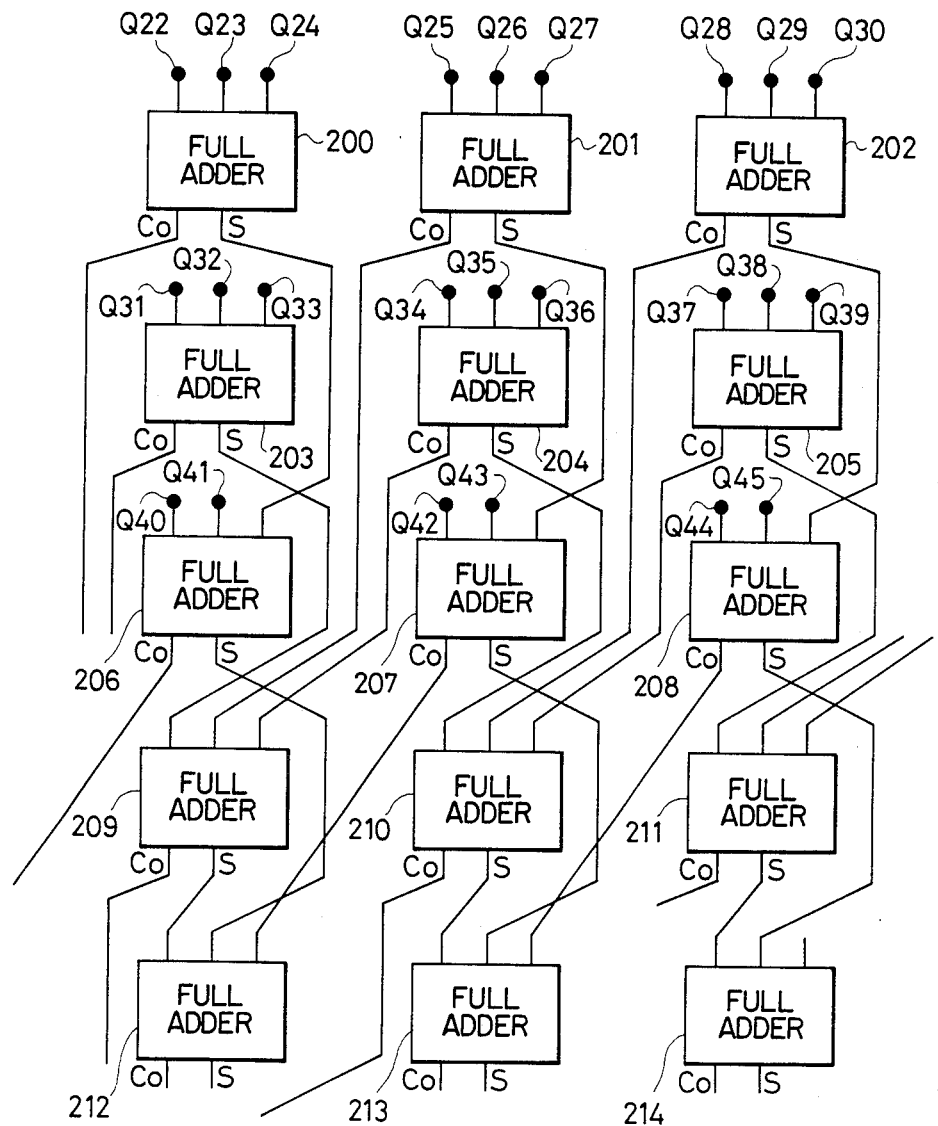
FIG. 2 is a diagram showing the structure of an adder circuit based upon a Wallace tree.
Figure 3:
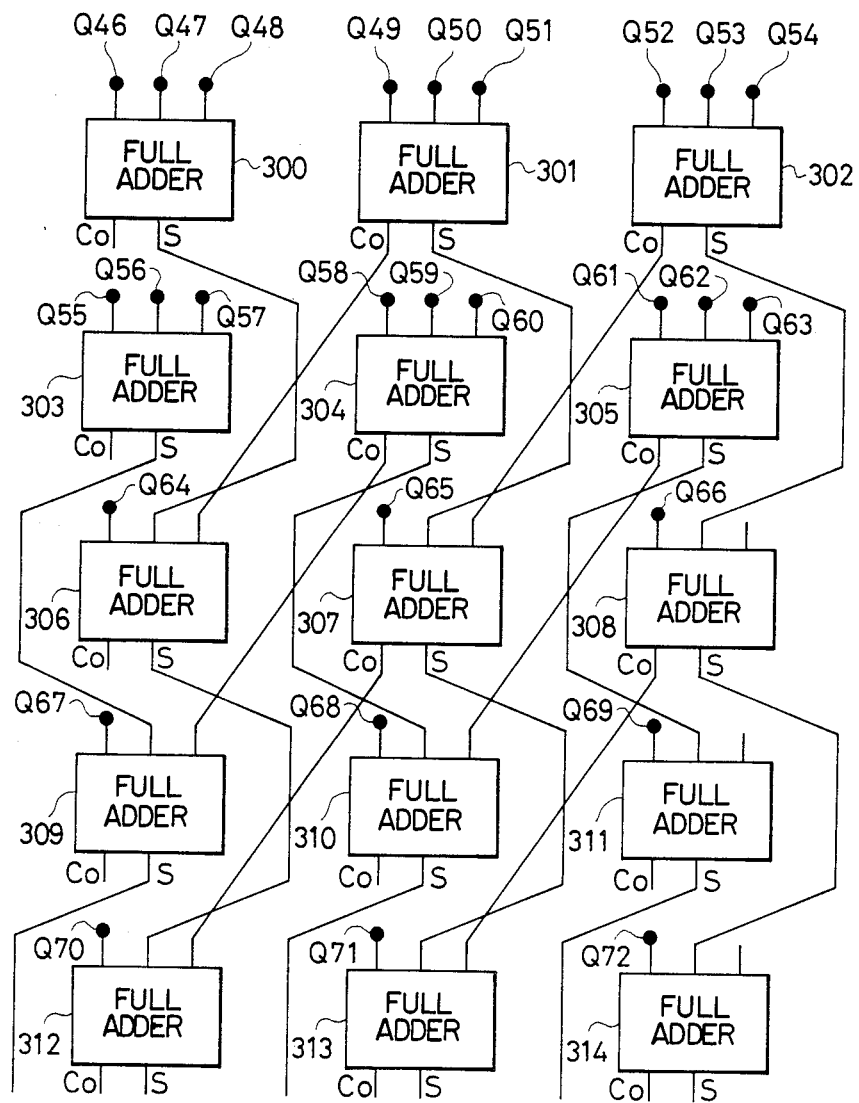
FIG. 3 is a diagram showing the structure of a widely known adder circuit.

A line 1 represents the case where the carry save addition shown in FIG. 1 is employed, a line 2 represents the case where the conventional example shown in FIG. 3 is employed, a line 3 represents the case where the fourth embodiment of the present invention shown in FIG. 13 is employed, a line 4 represents the case where the fifth embodiment of the present invention shown in FIG. 15 is employed, and a line 5 represents the case where the modified Booth algorithm and the Wallace tree of FIG. 2 are employed in combination.

It will be understood from FIG. 17 that the multiplier according to the fifth embodiment of the present invention has a bit number of smaller than 64, and has the addition stages in a number nearly equal to that of when the modified Booth algorithm which is the conventional highest-speed multiplier system and the Wallace tree are combined.

According to the present invention as described above, there is obtained a multiplier which enables the number of addition stages to be reduced by more than one-half without disturbing regular arrangement of the carry save adder circuit.

The multiplier according to the present invention is regularly constructed and facilitates the design of an LSI.

That is, the man-hours for design can be greatly reduced, the circuit area can be reduced, and the same cells can be used for all of the unit circuits, presenting a great advantage of simplifying the circuit layout.

Moreover, the multiplier according to the present invention operates at such a high speed that it makes it easy to process a variety of signals, lending itself well for being used even in the field of image processing.

What is claimed is:

1. A multiplier including means for adding a plurality of partial products that are formed from a multiplier and a multiplicand, said means for adding comprising:

first adder unit, a second adder unit and a third adder unit, each of which includes a front full adder and a rear full adder, respectively, and each front full adder and rear full adder includes a first input, a second input, a third input, a sum output and a carry output, respectively;

wherein said first input of said rear full adder of said first adder unit is connected to receive said sum output of said front full adder of said first adder unit;

wherein said first input of said rear full adder of said second adder unit is connected to receive said sum output of said front full adder of said second adder unit;

wherein said first input of said read full adder of said third adder unit is connected to receive said sum output of said front full adder of said third adder unit;

wherein said third input of said front full adder of said third adder unit is connected to receive said carry output of said front full adder of said second adder unit;

wherein said third input of said rear full adder of said third adder unit is connected to receive said sum output of said rear full adder of said first adder unit; and wherein said first input, said second input and said third input of said front full adder of said first adder unit, said second input and said third input of said rear full adder of said first adder unit, said first input, said second input and said third input of said front full adder of said second adder unit, said second input and said third input of said rear full adder of said second adder unit, as well as said first input and said second input of said front full adder of said third adder unit are connected to receive bits of partial products.

2. A multiplier according to claim 1, wherein said second input of said rear full adder of said third adder unit is connected to receive said carry output of said rear full adder of said second adder unit.

3. A multiplier according to claim 1, further comprising:

a fourth adder unit and a fifth adder unit, each of which includes a front full adder and a rear full adder, respectively, and each of said front full adder and said rear full adder includes a first input, a second input, a third input, a sum output and a carry output, respectively;

wherein said first input of said rear full adder of said fourth adder unit is connected to receive said sum output of said front full adder of said fourth adder unit;

wherein said first input of said rear full adder of said fifth adder unit is connected to receive said sum output of said front full adder of said fifth adder unit;

wherein said third input of said rear full adder of said fourth adder unit is connected to receive said sum output of said rear full adder of said second adder unit;

wherein said third input of said front full adder of said fifth adder unit is connected to receive said carry output of said front full adder of said fourth adder unit;

wherein said second input of said rear full adder of said fifth adder unit is connected to receive said carry output of said rear full adder of said second adder unit;

wherein said third input of said rear full adder of said fifth adder unit is connected to receive said sum output of said rear full adder of said third adder unit; and wherein said second input of said rear full adder of said third adder unit, said first input and said second input of said front full adder of said fourth adder unit, said second input of said rear full adder of said fourth adder unit, as well as said first input and said second input of said front full adder of said fifth adder unit are connected to receive other bits of partial products.

* * * * *